Patented Feb. 18, 1941

2,231,901

UNITED STATES PATENT OFFICE 2,231,901

PROCESS OF HYDRATING CALCINED GYPSUM

Joseph W. Gill, Elmhurst, Ill., assignor to United States Gypsum Company, Chicago, Ill., a corporation of Illinois No Drawing. Original application April 15, 1933, Serial No. 666,352. Divided and this application October 24, 1936, Serial No. 107,371

1 Claim. (Cl. 134—58)

This invention relates to a process of hydrating calcium sulfate. This application has been divided out of James S. Offutt and Joseph W. Gill application Serial No. 666,352, filed April 15, 1933 which is the parent case of a co-pending continuation-in-part Offutt and Gill application Serial No. 259,386, filed March 2, 1939.

In the coating of paper, it has been the practice to use satin white as the pigment base of the coating material. Satin white is made by treating an alum solution with lime so that the resulting product contains a substantial proportion of aluminous gel, which gives the coating material certain characteristics that are objectionable. The use of pure recrystallized and deflocculated gypsum, free of aluminous gel, instead of satin white, gives a coating which, although acquiring a somewhat lower (less glossy) finish on calendering than satin white coatings, will show excellent levelness or smoothness, which is necessary to permit high grade printing. The coating which can be produced from my special form of gypsum also takes ink exceptionally well and in addition has other important advantages. A coating comprising the improved deflocculated gypsum base shows less tendency to darken when heavily calendered than does a coating material with a satin white base. The deflocculated gypsum requires less casein to secure a given adhesion of the coating to the body of the paper than that required when satin white is used as a base pigment. The deflocculated gypsum coating material can be dried, disintegrated, and then readily mixed again with water to form a smooth slurry, which is not true with satin white finishes, which are not readily re-dispersed properly after drying, owing to the presence of partially dehydrated aluminum oxide which is not reversible to gel form.

In hydrating plaster of Paris to form deflocculated hydrated gypsum, it has heretofore been thought necessary to use a relatively large amount of water (from 4 to 8 parts water per part plaster by weight) to prevent the slurry from setting during the agitation when a paddle agitator is used. The use of this large amount of water at a paper coating mill would be a considerable inconvenience, as it necessitates a partial dewatering of the prepared recrystallized gypsum slurry before it can be mixed with casein glue to form a "color" of consistency suitable for coating paper. This point is of particular importance as many coating mills do not have dewatering equipment such as filter presses and centrifuges which would be necessary to remove the excess water. However, while I have found it advantageous to prepare the paper coating with a much smaller amount of water than above indicated, yet, if desired, the deflocculated gypsum may be prepared by the use of a large amount of water to produce substantially the same end product; for I believe the use of recrystallized and/or deflocculated gypsum as a paper coating material to be new regardless of its method of manufacture.

I have found that by adding certain electrolytes in small amounts to the water in which the plaster is hydrated to form deflocculated gypsum, the tendency for the slurry to stiffen excessively or set during the hydration while being stirred in any suitable agitator, is considerably reduced, thus permitting the manufacture of deflocculated gypsum from a mixture of 1½ to 2 parts water per part of plaster by weight. A deflocculated gypsum so formed can be compounded to a satisfactory coating color by merely adding the requisite quantity of casein glue. I have found that from 1½ to 2 parts by weight of an alkali phthalate per 100 parts of calcined gypsum plaster, are effective in reducing the setting tendency of the plaster, although these limits can be widened considerably without essentially changing the characteristics desired in the process. A still more effective electrolyte is sodium phthalate, especially when made alkaline with a slight excess of caustic soda. The potassium salts of the above named electrolytes may also be used, if desired.

The exact reason for this action of these electrolytes is not completely known. Their effect on the size and shape of the gypsum crystals obtained on hydrating the calcined gypsum plaster will, undoubtedly, afford a partial explanation of the action. The crystals of hydrated gypsum, particularly when the alkaline phthalate is used, have a smaller length to breadth ratio than when ordinary plaster-water mix or plaster-water mix containing small amounts of other salts are used.

In general, as the particle size decreases, the consistency, the casein required for a coating material, the opacity or hiding power, and hence, the whiteness of the applied coating, and the levelness or printing smoothness of the coating increase. The glare obtainable seems to vary but little with change in particle size, but can be varied considerably by varying the calendering process. An additional advantage of the controlled shape and size obtainable with my improved gypsum pigment lies in the improved spreading qualities obtainable, for the spreading characteristics of precipitated gypsum "color" depends somewhat on the ratio of crystal length to thickness, an excessive length generally causing poorer spreading characteristics.

The product resulting when the calcined gypsum is agitated with the above amount of water, containing the electrolyte, consists of a slurry having about the consistency of stiff cream. This fluid slurry, after about one hour of agitation, contains deflocculated, completely hydrated gypsum in recrystallized form, the crystals being plate-like and about 4 times as long as broad, while gypsum similarly hydrated but in the presence of substantially water alone has needle-like crystals measuring about 13 to 25 times as long as broad. These crystals average about 5.4 microns in length while crystals produced without an electrolyte and with larger quantities of water average about 14 microns in length. A coating composition suitable for many purposes can be prepared by simply adding the proper amount of adhesive, such as casein glue, to the slurry. However, in many other cases it will be found desirable to incorporate other materials well known to the art, along with the adhesive and my improved gypsum pigment, to secure a coating composition having the properties desired.

As a specific illustration of the application of this invention in the preparation of a casein-containing coating color, the following formula has been used with satisfaction: 8.5 parts by weight phthalic acid, and 5.5 parts of sodium hydroxide were dissolved in 1300 parts of water at room temperature. 850 parts of white molding plaster or calcined gypsum were added to this solution and the mix was stirred for one hour in a standard mechanical mixer. The slurry produced was now a viscous fluid. To this slurry were added 1100 parts of casein glue containing 170 parts of dry casein. It is immaterial whether the sodium phthalate is added as such, or whether it is formed in the solution by the use of phthalic acid or anhydride, together with the equivalent amount of sodium hydroxide, a slight excess of the latter being desirable. The resulting mixture after straining represents the coating color which is used directly on the paper coating machine.

The equipment required for making the deflocculated gypsum, is an agitator of sufficient strength that a positive agitation or kneading will be given to the whole plaster-water mix, together with such accessories as storage tanks, piping, weighing and measuring devices, etc. Since plaster, mixed at the consistency required in this process when soda ash is used as the set inhibitor does show a distinct, though reduced, tendency to set during hydration, the agitator must be sufficiently powerful to keep the slurry in fluid motion at all times. The maximum speed that can be used without throwing the material out of the agitator gives the best results. A power driven bakery mixer gives good results.

The deflocculated gypsum coating colors are handled on the coating machine in the usual manner. It may be found advisable to run the machine at a somewhat higher speed than usual, or else use a somewhat harder sized raw stock, as the paper stock seems to draw the water from the deflocculated gypsum coating faster during the setting stage of the operation than it does from a clay coating. The deflocculated gypsum coatings are relatively more satisfactory in medium and heavy coatings than in light (below 10 pounds) coatings. The essential point in finishing deflocculated gypsum coatings is to calender the paper with decidedly more pressure than is usually used, particularly, more than is used on satin white coatings. This can be safely done, as the deflocculated gypsum coating is substantially free from any tendency to blacken under pressure up to the limit the fiber will stand without crushing. The heavy calendering aids in bringing out the levelness characteristic of deflocculated gypsum coatings and in increasing the glare, and thus improves the printing qualities of the stock.

The main advantages of my improved deflocculated gypsum coating are:

Compared to clay coatings:
1. Smoother surface for printing.
2. Somewhat higher glare.
3. Whiter color.

Compared to satin white-clay coating:
1. Equal or better printing smoothness.
2. A more flexible sheet, permitting heavier coating without danger of cracking on folding.
3. Freedom from tendency to blacken on calendering.
4. Lower cost.

I would state in conclusion that while the examples described constitute practical embodiments of my invention, I do not wish to limit myself precisely to these details, since manifestly, the same may be considerably varied without departing from the spirit of the invention as defined in the appended claim.

Having thus described my invention, I claim as new and desire to secure by Letters Patent:

A process of hydrating calcined gypsum without substantial setting thereof which comprises agitating one part of calcined gypsum with substantially 1½ to 2 parts of a dilute aqueous solution of an alkali metal phthalate.

JOSEPH W. GILL.